United States Patent [19]

Thouvenin

[11] Patent Number: 4,626,978
[45] Date of Patent: Dec. 2, 1986

[54] STATIC POWER FREQUENCY CONVERTER

[75] Inventor: Jean-Marie Thouvenin, Seyssinet Pariset, France

[73] Assignee: Saphymo-Stel, Massy, France

[21] Appl. No.: 755,277

[22] Filed: Jul. 15, 1985

[30] Foreign Application Priority Data

Jul. 13, 1984 [FR] France ................... 84 11182

[51] Int. Cl.⁴ .................. H02M 5/45; H05B 6/06
[52] U.S. Cl. ........................... 363/37; 363/49; 363/79; 219/10.77
[58] Field of Search ............. 363/37, 49, 79; 219/10.77, 10.55 B

[56] References Cited

U.S. PATENT DOCUMENTS 4,096,557 6/1978 Schworz .................... 363/9

FOREIGN PATENT DOCUMENTS 0081275 6/1982 European Pat. Off. .
2034940 6/1980 United Kingdom .

Primary Examiner—William B. Perkey
Attorney, Agent, or Firm—Roland Plottel

[57] ABSTRACT

The static converter of the invention comprises a central processor (15) measuring the output voltage (TM3), the output current (TM4), the rectifier current (S) and the reverse bias time (8) of the thyristors of the switch (5). From this information it drives, through interfaces (17, 18, 20) the starting thyristors (6) comprising a series resonating circuit intitiating the oscillations of the parallel resonant load circuit (2,3).

17 Claims, 23 Drawing Figures

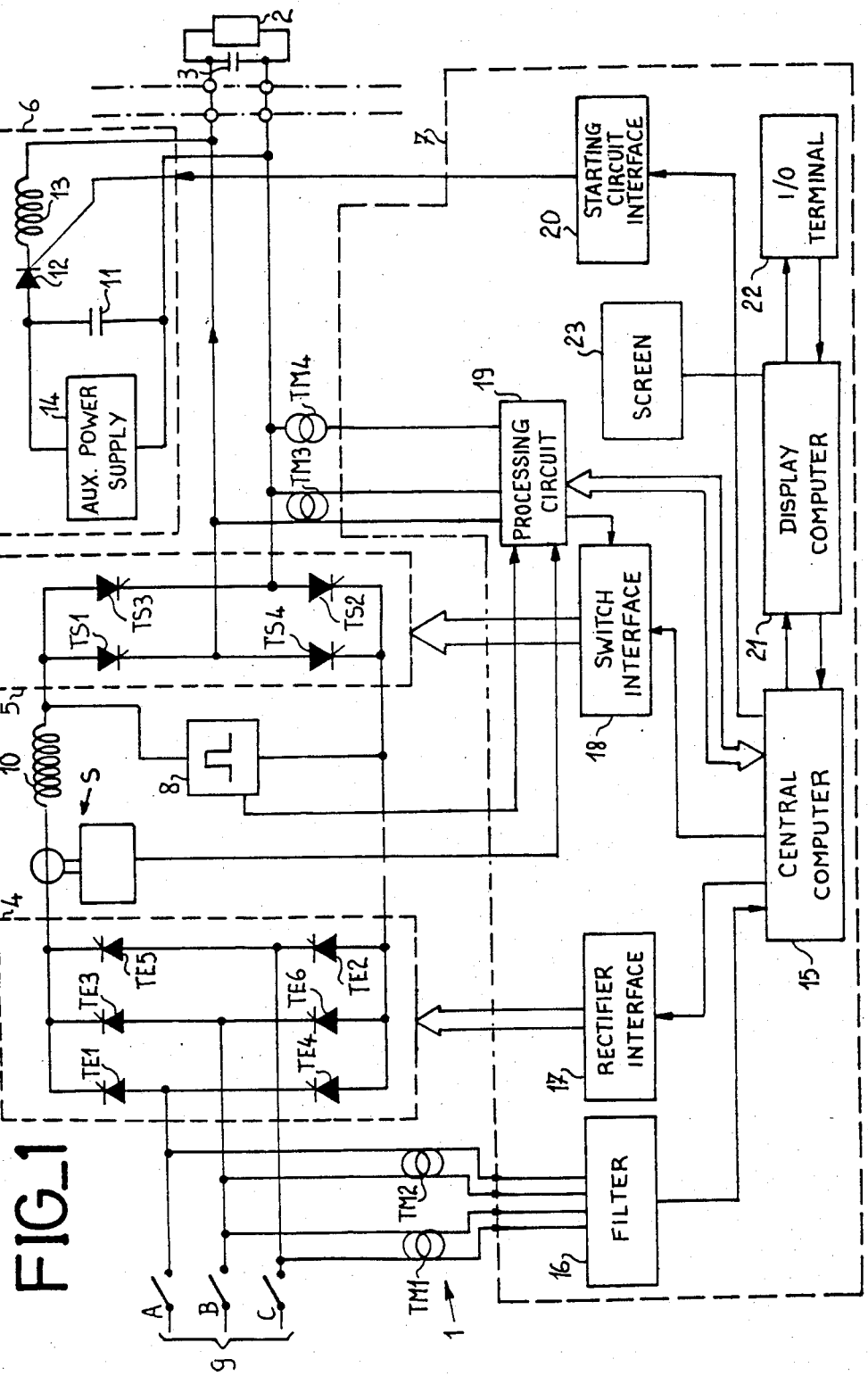
FIG_1

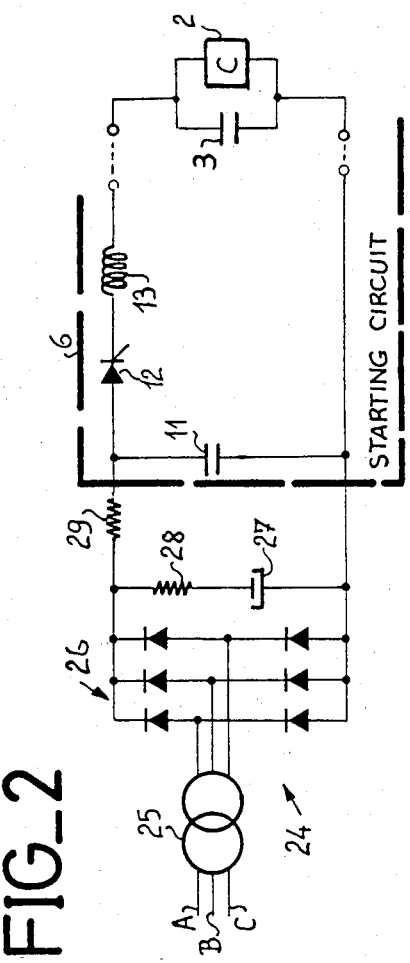
FIG_2
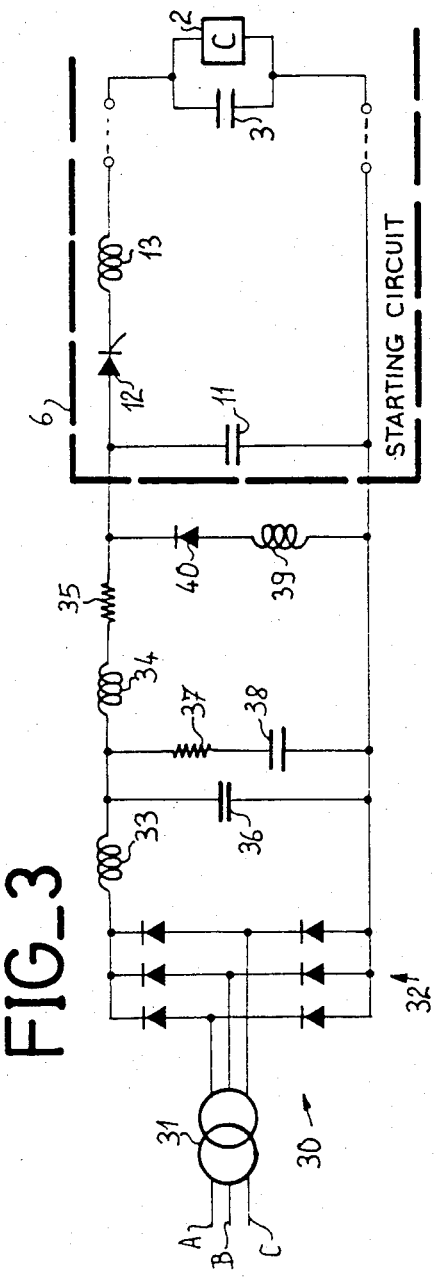
FIG_3

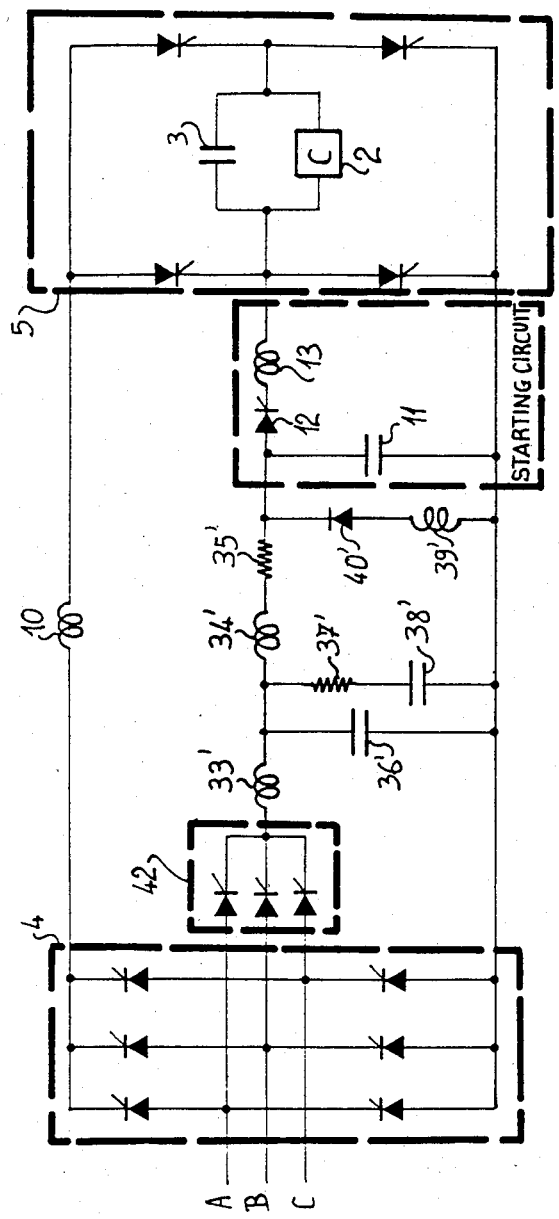
FIG_4

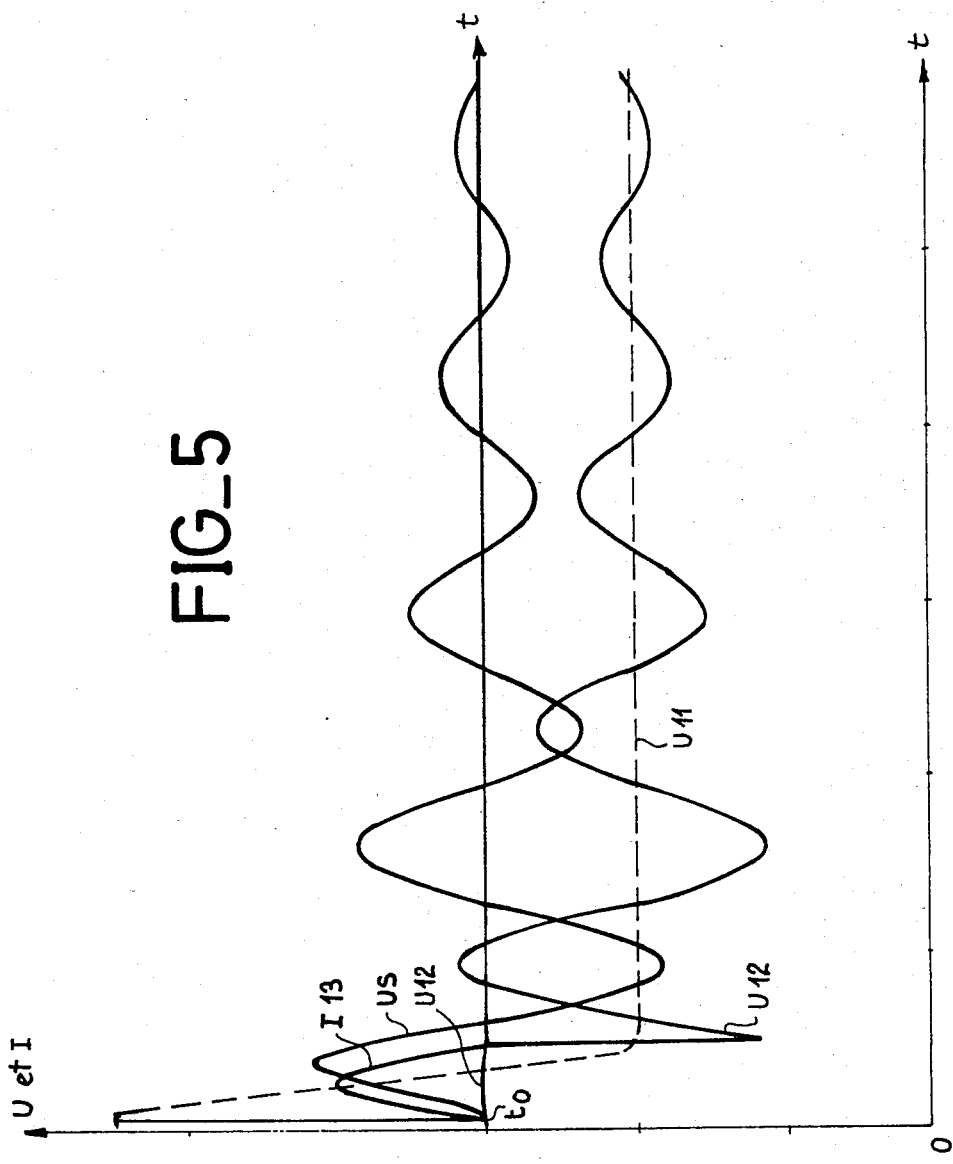

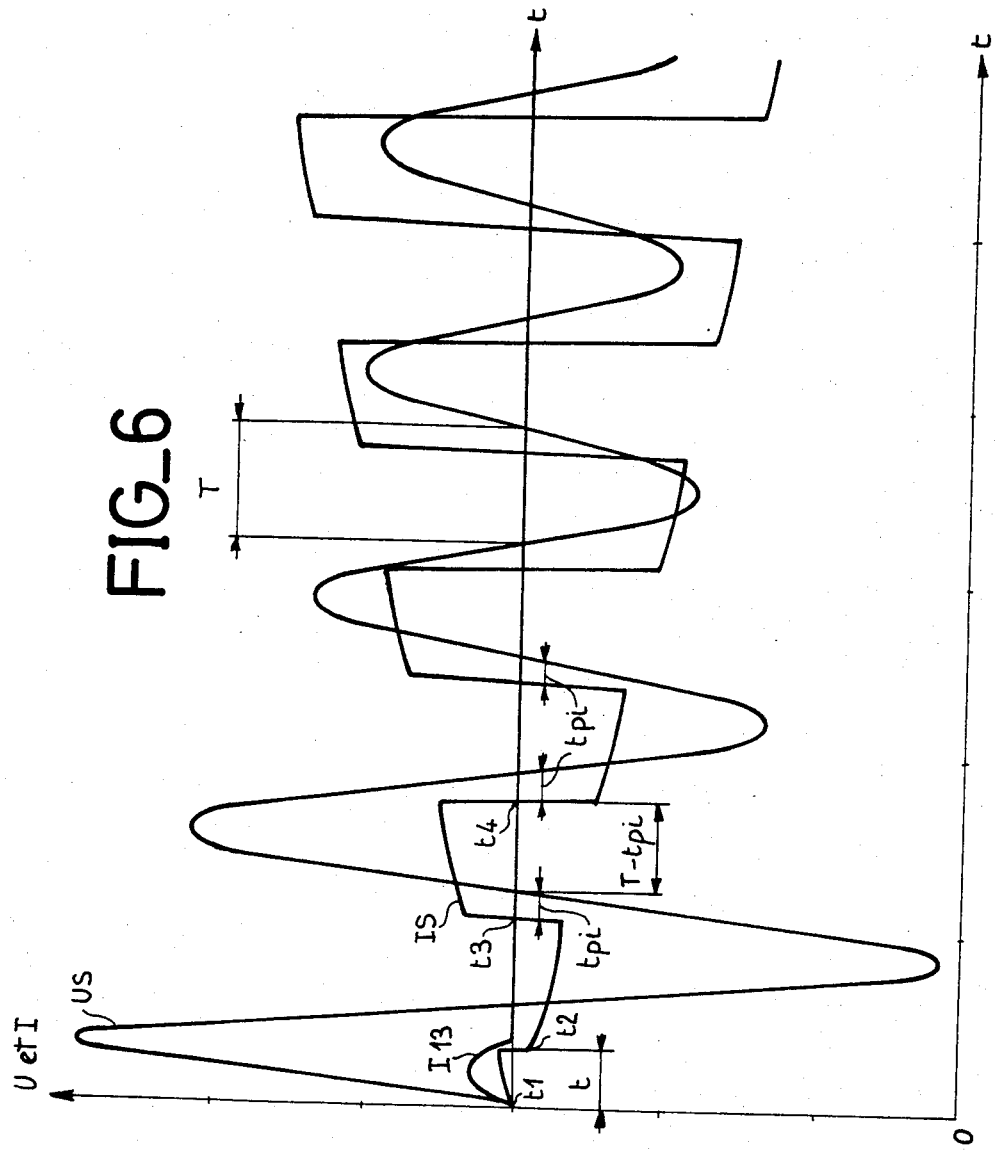

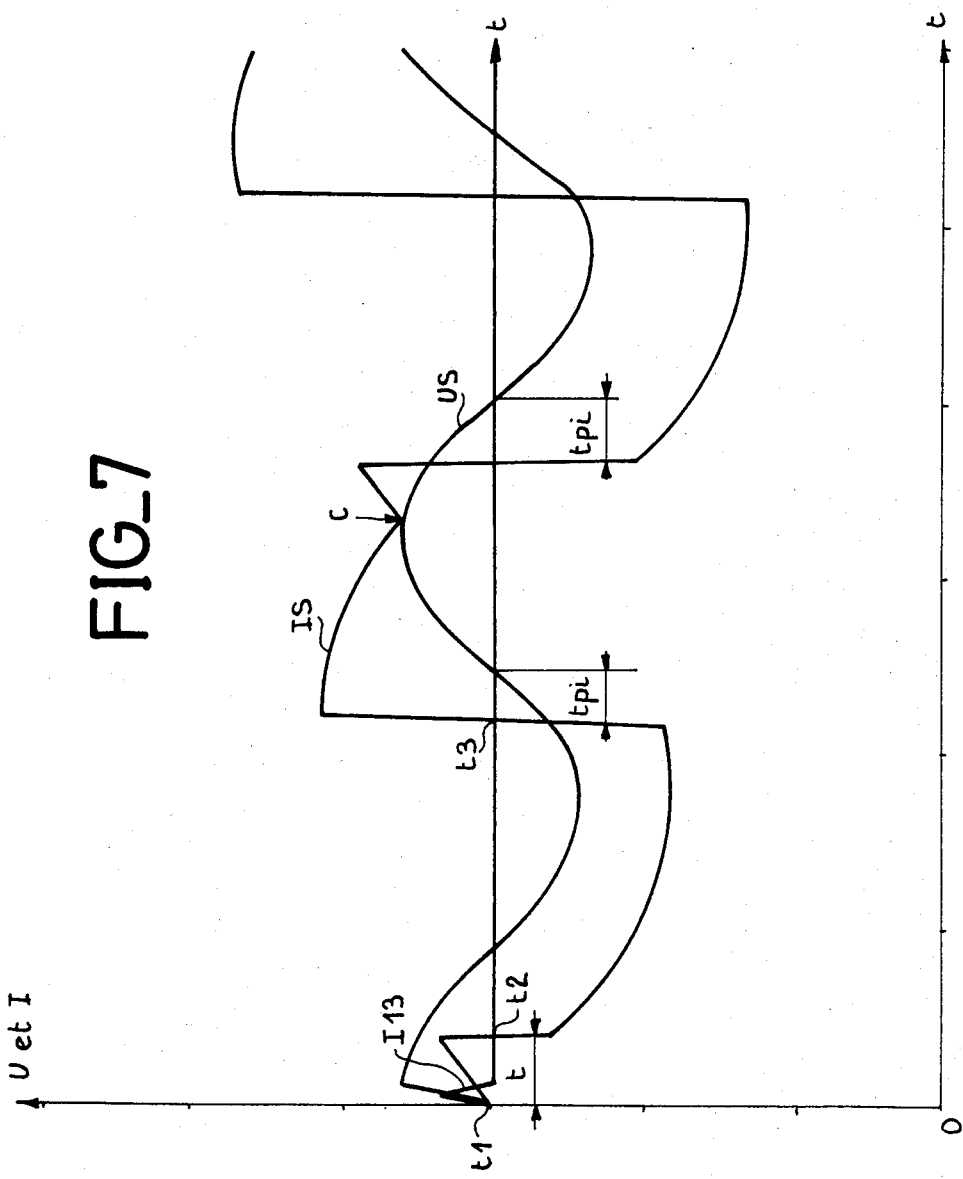

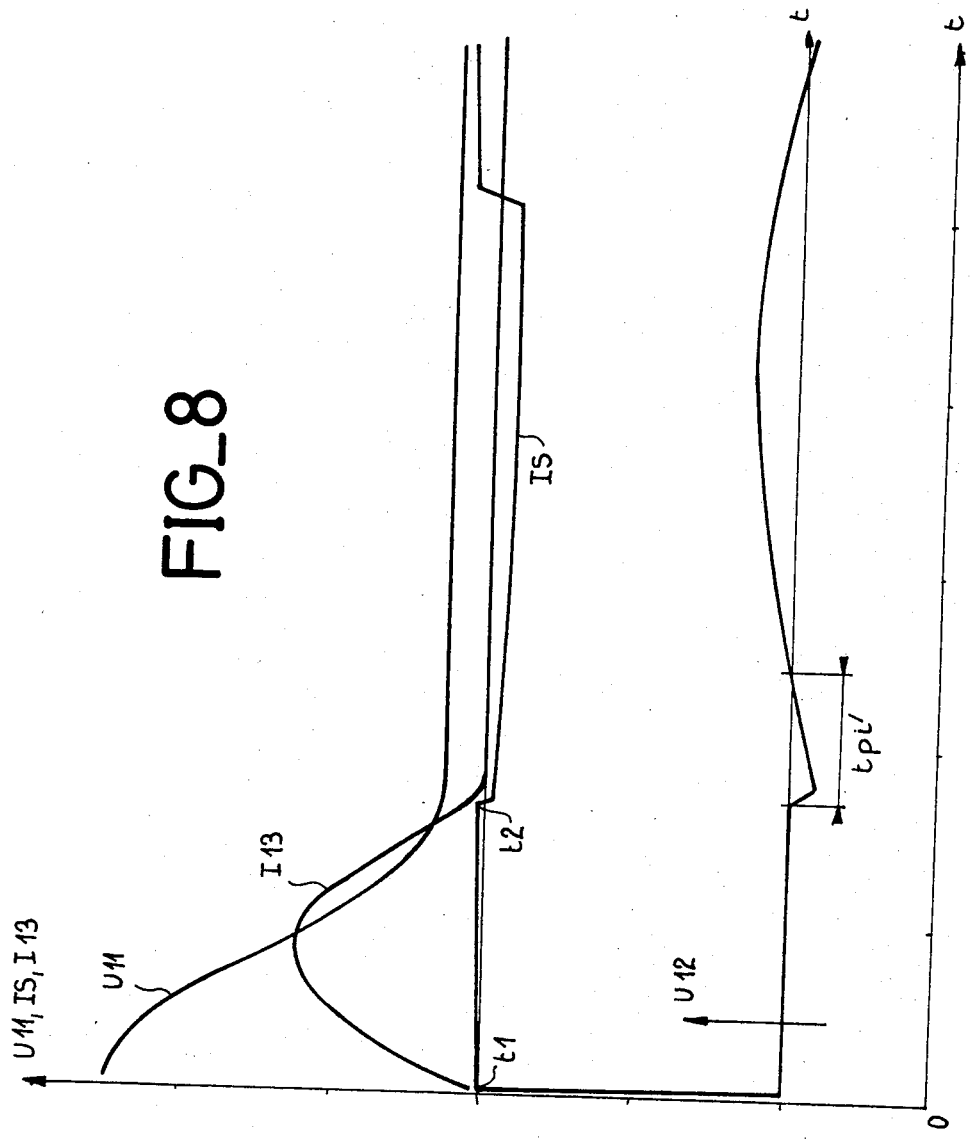

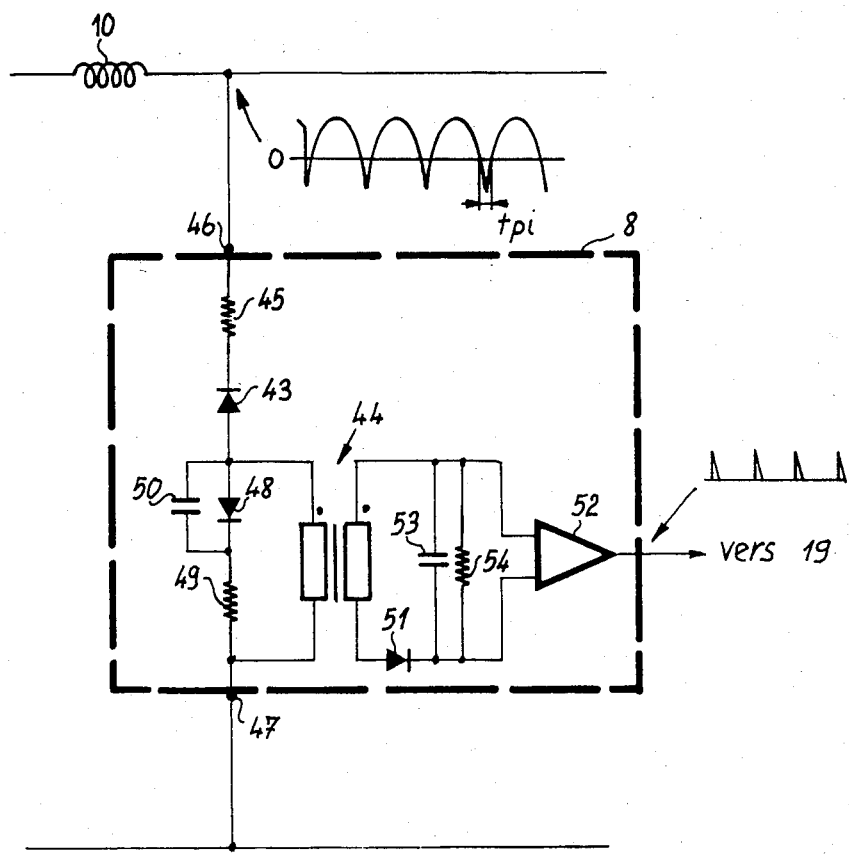
FIG_9

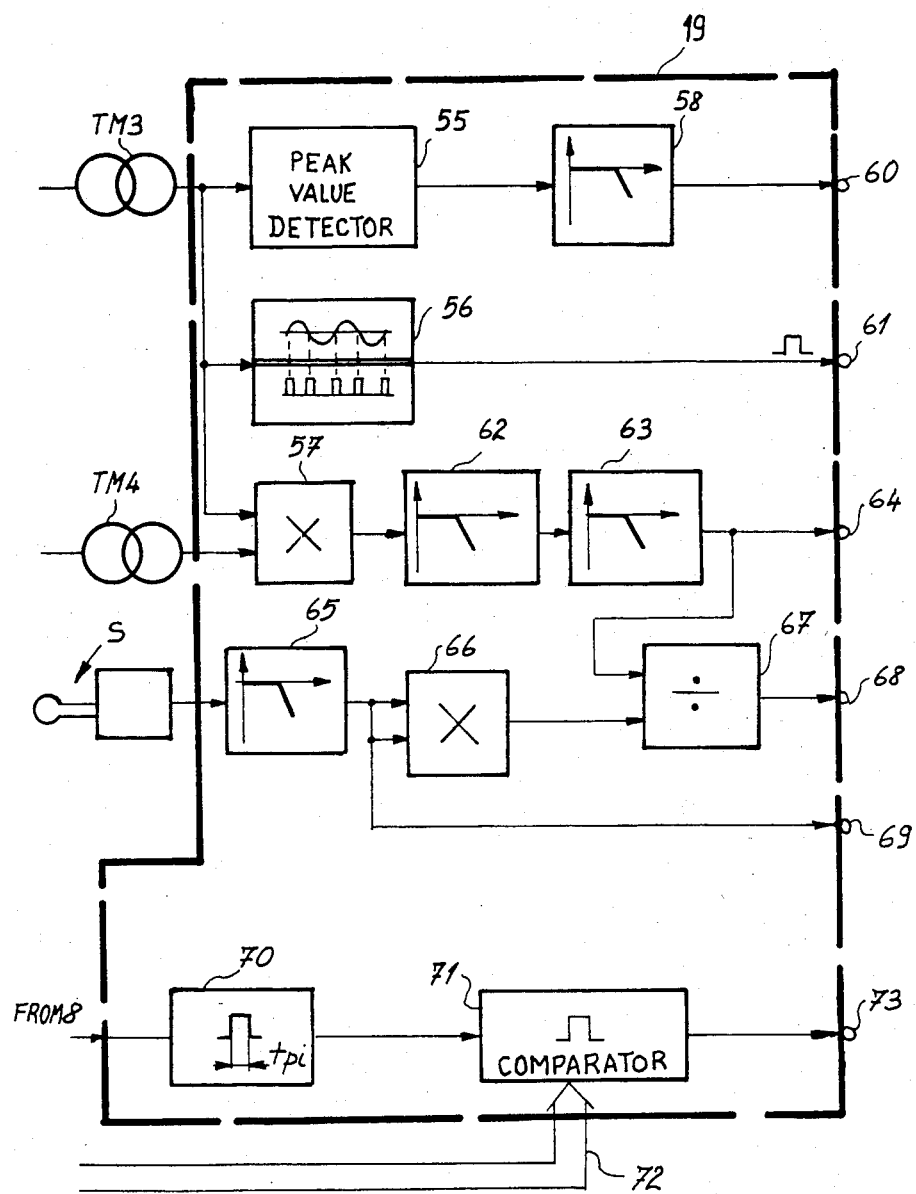
FIG_10

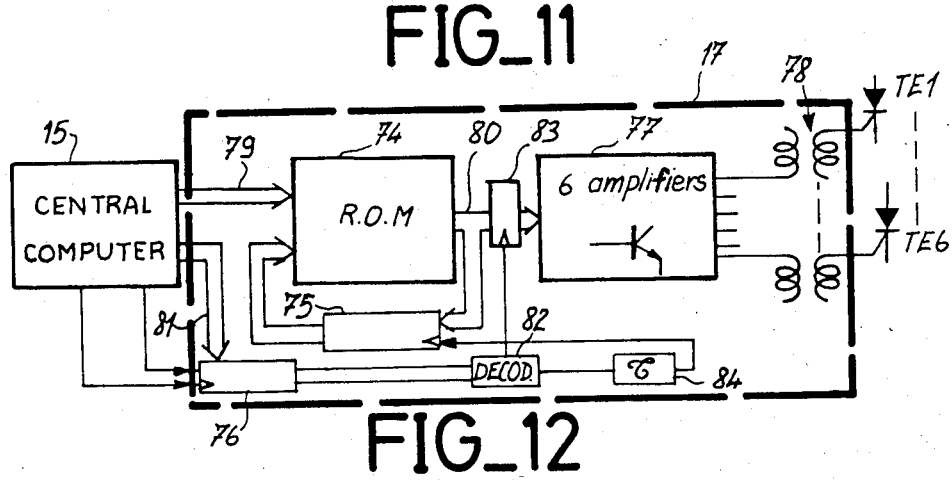
FIG_11
FIG_12
| M | C2 | C1 | C0 | |
|---|---|---|---|---|
| 0 | 0 | 0 | 0 | INDIFFERENT |
| 0 | 0 | 0 | 1 | TORQUE 1.2 |
| 0 | 0 | 1 | 0 | TORQUE 4.5 |
| 0 | 0 | 1 | 1 | TORQUE 2.3 |
| 0 | 1 | 0 | 0 | TORQUE 5.6 |
| 0 | 1 | 0 | 1 | TORQUE 3.4 |
| 0 | 1 | 1 | 0 | TORQUE 6.1 |
"0" = NORMAL MODE
"1" = FRE-WHEEL MODE

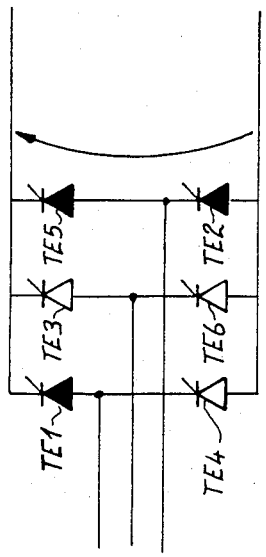
FIG_13
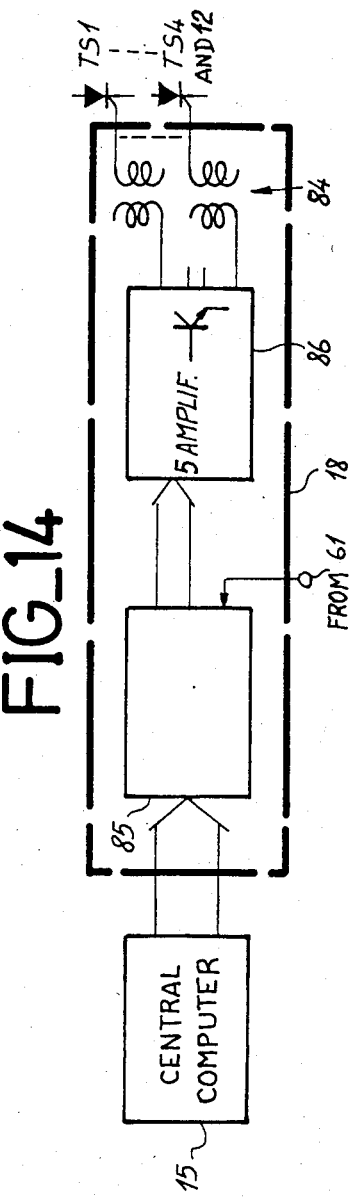
FIG_14

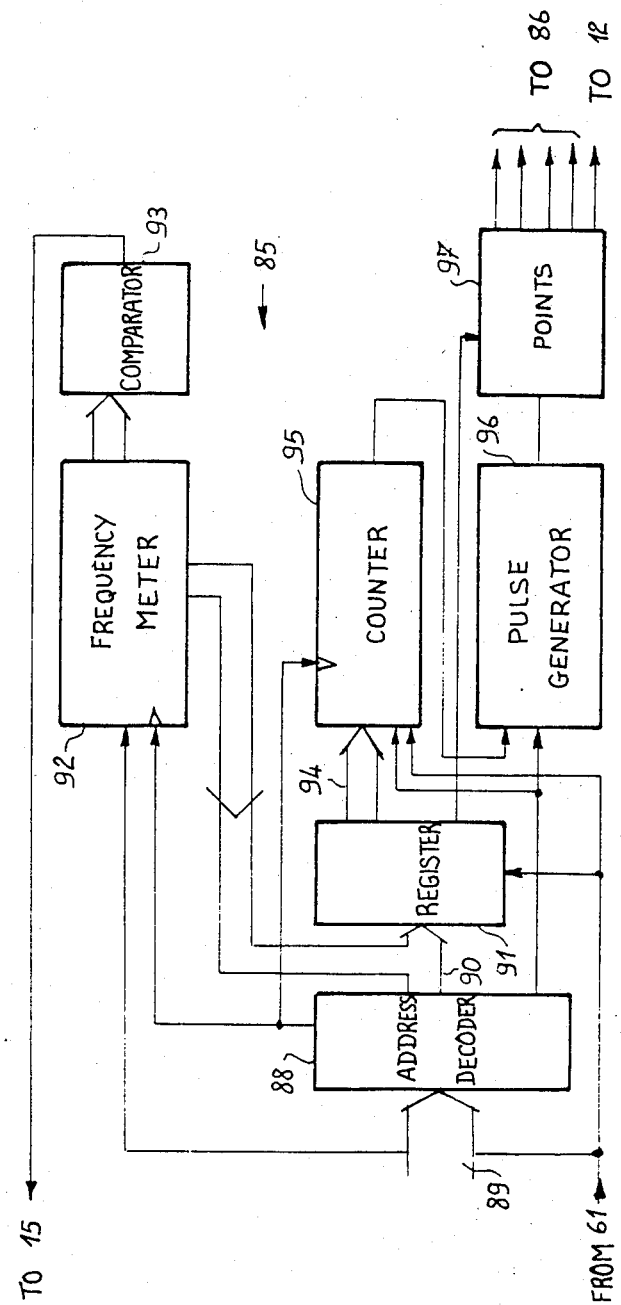

FIG_16
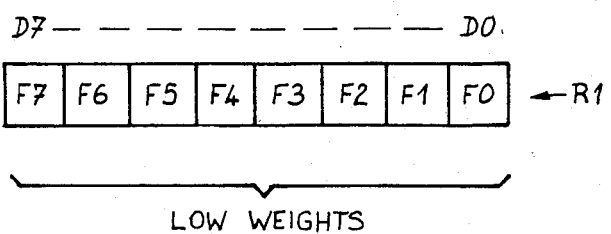
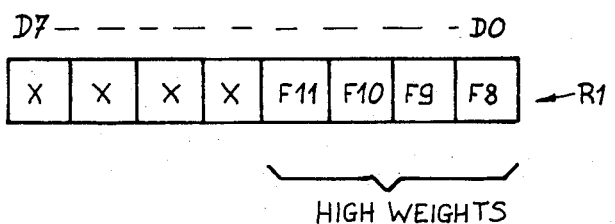
FIG_17
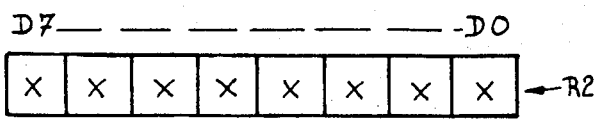

FIG_18
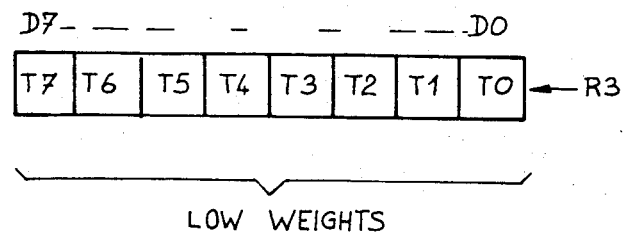
LOW WEIGHTS
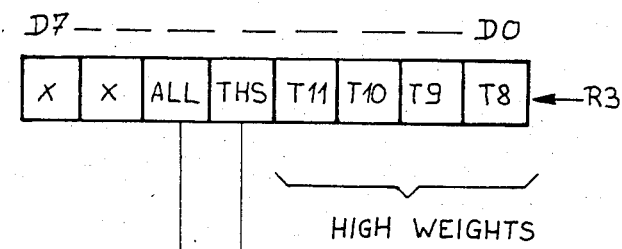
HIGH WEIGHTS
THS = "0" → CONTROL OF 12 ONLY
THS = "1" → CONTROL OF TS1 TO TS4 (NORMAL MODE)
ALL = "0" → NORMAL MODE
ALL = "1" → SHORT-CIRCUIT MODE

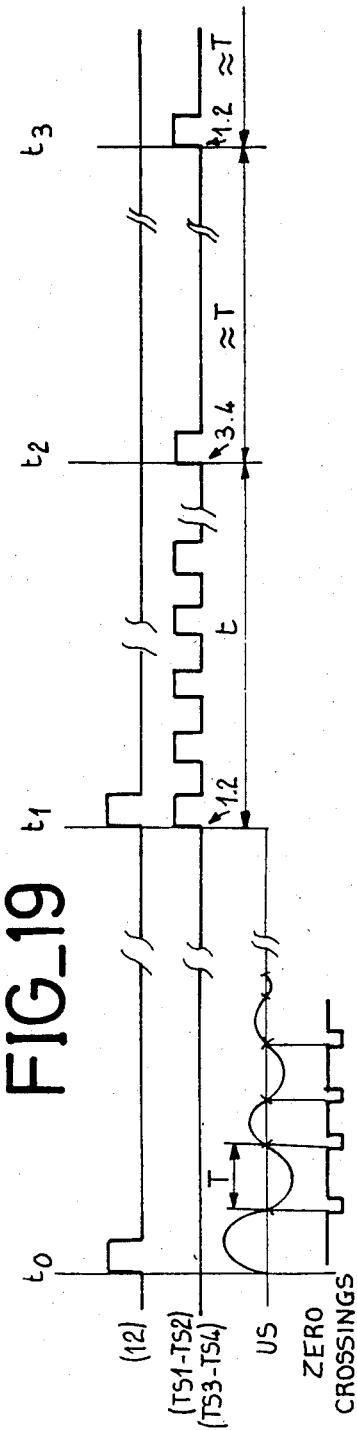
FIG_19
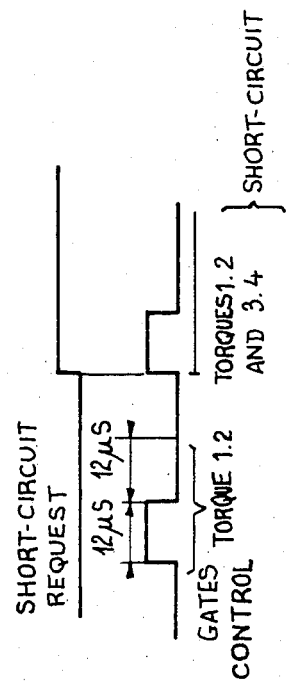
FIG_20
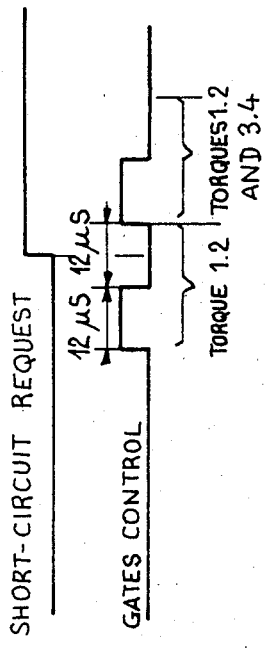
FIG_21

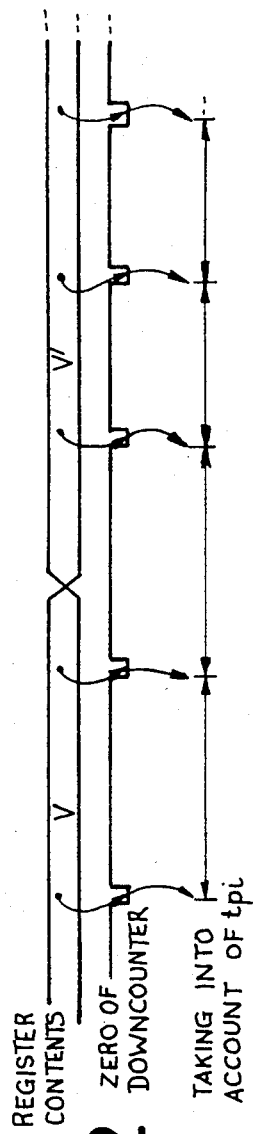
FIG_22
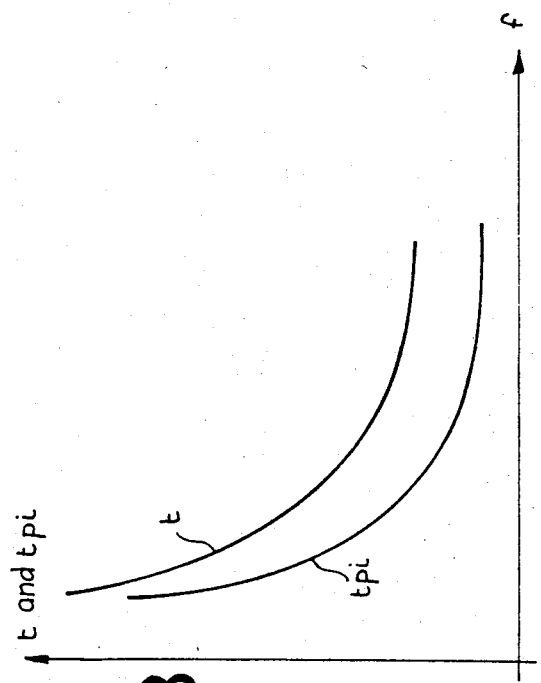
FIG_23

STATIC POWER FREQUENCY CONVERTER

The present invention relates to static power frequency converter.

Present frequency converters, of the thyristor type, are not very flexible in use, in particular in so far as their start up is concerned when the output frequency may vary in a wide ratio, for example from 1 to 3. In addition, in known converters, when the reverse bias time of the thyristors is smaller than their turn off, or else when the voltage of the terminals of the switches is too small to turn off the output current, that causes a deficiency in disabling these thyristors and short circuit of the output switch.

The present invention relates to a static power frequency converter capable of following the variations of parameters of the load as rapidly and as faithfully as possible, even when the natural frequency of the load varies in wide proportions, and in which the starting circuit allows the natural frequency of a load of the converter to be measured very rapidly and at a low level, this starting circuit also allowing the converter to operate in a low frequency pulsed mode by stopping-starting the start up circuit, in particular under low power conditions. Furthermore, the converter of the invention must present practically no risk of destruction of the thyristors of the output current switch.

The frequency converter in accordance with the invention comprises devices for measuring the output voltage, the output current, the current supplied by the rectifier and the reverse bias time of the controlled rectifiers of the switch, and a device for detecting the zero cross overs of the voltage of the mains power supplying the converter, these measuring and detection devices being connected to a central digital processor connected by interfaces to the electrodes controlling the controlled rectifiers of the rectifier and of the switch of the converter.

The present invention will be better understood from reading the detailed description of several embodiments of the invention, taken as non limitative examples, and illustrated by the accompanying drawings in which:

FIG. 1 is a block diagram of a frequency converter according to the invention;

FIG. 2 is a schematical view of a simplified starting circuit of the converter of FIG. 1;

FIGS. 3 and 4 are circuit diagrams of a starting circuit and of a variant thereof, respectively, of the converter of FIG. 1;

FIGS. 5 to 8 are timing diagrams of signals appearing in the converter of FIG. 1;

FIG. 9 is the diagram of one embodiment of the reverse bias time detector (TPI) of the thyristors of the switch of the converter of FIG. 1;

FIG. 10 is the block diagram of one embodiment of a processing circuit supplying certain signals to the central processor of the converter of FIG. 1;

FIG. 11 is a simplified block diagram of one embodiment of the circuits controlling the input thyristors of the converter of FIG. 1;

FIG. 12 is an explanatory diagram of the operation of the control circuits of the input thyristors of the converter of FIG. 1;

FIG. 13 is a general diagram explaining the "free wheeling" of the thyristors of the rectifier of the converter of FIG. 1;

FIG. 14 is a simplified block diagram of one embodiment of the circuits controlling the thyristors of the converter of FIG. 1;

FIG. 15 is a block diagram of one embodiment of the circuits controlling the output thyristors of the converter of FIG. 1;

FIG. 16 is an explanatory diagram of the operation of the interfacing register of the circuits of FIG. 15, for supplying frequency information;

FIG. 17 is the diagram of the contents of a register of the circuits of FIG. 15, for particular operating conditions;

FIG. 18 is an explanatory diagram of the operation of two interfacing registers of the circuits of FIG. 15, for supplying reverse bias time information;

FIG. 19 is a timing diagram of the pulses at the level of the thyristor of the starting circuit and of the thyristors of the switch of the converter of FIG. 1, during the two starting phases;

FIGS. 20 and 21 are timing diagrams of a normal case and of a particular case, respectively, of pulses for short circuiting the switch of the converter of FIG. 1;

FIG. 22 is a diagram of some signals appearing during the change of value of tpi in the converter of FIG. 1, and FIG. 23 is a diagram of two curves representing respectively the trend of the variations of tpi and t (firing delay of the output bridge of the switch of FIG. 1) as a function of the measured oscillation frequency.

The frequency converter 1 the block diagram of which is shown in FIG. 1 is intended to be used with an induction heating apparatus whose load 2 has an inductive impedence in which the value of the impedence may vary in wide proportions. In parallel across this inductive load is disposed, in a way known per se, a capacitive impedance 3 for forming an oscillating circuit. However, the invention is of course not limited to such an application, and it may be used in most static converters, in particular power converters, not only of the current source type (with a load forming part of a parallel oscillating circuit as in the example described above) but also of the voltage source type (series oscillating circuit).

The converter 1 comprises five main parts: an input thyristor rectifier 4, an output thyristor switch 5, a starting circuit 6, a control circuit 7 and an assembly of interfacing means between the power circuits and the control circuits, comprising measuring transformers TM1 to TM4, a current probe S, for example a Hall effect probe, a circuit 8 for detecting the reverse bias time shown in greater detail in FIG. 9, and firing transformers for the thyristors, not shown in FIG. 1.

The input of rectifier 4 is connected to an electric power supply network 9. In the case where, as shown in FIG. 1, the network 9 is three phase, the rectifier 4 comprises six thyristors TE1 to TE6 connected as a conventional three phase rectifier bridge, and if not rectifier 4 comprises an appropriate number of thyristors.

Rectifier 4 is connected to switch 5 by a series smoothing inductor 10. Switch 5 comprises four thyristors TS1 to TS4 connected conventionally as a controlled bridge, whose output is connected to load 2.

The starting circuit 6, described in greater detail hereafter with reference to FIGS. 2 to 4, comprises essentially a series circuit connected to the output terminals of the switch and formed of a capacitor 11, a thyristor 12 and an inductance 13, an auxiliary power supply circuit 14 being connected to the terminals of capacitor 11.

The control circuit 7 comprises a central processor 15, for example a microprocessor of type 6809. This processor is connected: to the output of a filtering and zero cross over detection circuit 16, to the input of a control interface 17 of the rectifier, to the input of a control interface 18 of the switch, to a processing circuit 19 and to the input of a control interface 20 of the starting circuit. Furthermore, the processor is connected bidirectionally, preferably via an RS232 connection, to a display slaved processor 21, itself connected bidirectionally to an input-output terminal 22. Processor 21, for example a microprocessor 6809 is connected to an appropriate display device 23 for example a television monitor.

The measurement transformers TM1 and TM2 are each connected to a phase pair of the power supply network, for example pairs (B, C) and A,B) respectively.

Their outputs are connected to filter 16, which is a band pass filter whose pass band goes from 47 to 63 Hz for example.

The outputs of interface 17 are connected, in a way not shown, to the gates of thyristor TE1 to TE6 for controlling firing thereof in pairs in the way explained below with reference to FIGS. 11 to 13.

Interface 18, shown in greater detail in FIG. 15, is connected, in way known, per se and not shown in the drawings, to the gates of the thyristors of switch 5. This interface is also connected to an output of circuit 19.

The output of the starting circuit interface 20 is connected to the gate of thyristor 12.

The probe 5, for example of sensor of the trademark LEM, is connected to circuit 19, as well as the output of circuit 8.

The auxiliary power supply circuit 14 for the starting circuit may be for example provided as shown in one of FIGS. 2 to 4.

The auxiliary power supply circuit 24 of FIG. 2 comprises a galvanically insulated three phase transformer 25 connected to the three phase mains supplying the converter 1. The transformer 25 feeds a conventional three phase rectifier bridge 26. In parallel across the output of bridge 26 is connected a series circuit comprising a capacitor 27 and a resistor 28. The output of bridge 26 is connected via a series resistor 29 to the input of the starting circuit 6, this input being connected to the terminals of capacitor 11. This power supply 24, isolated by transformer 25 from the main power circuit, has small losses, the resistor 29 being able to be of a relatively high value. Since the time constant of circuit 29-11 is then high, which requires a relatively long time for recharging capacitor 11, this power supply 24 will be especially used in a case of infrequent start ups.

The power supply 30 of FIG. 3 is also isolated from the main power circuit by a transformer 31 feeding a rectifier bridge 32. The positive output terminal of this bridge is connected to the common point of capacitor 11 and of thyristor 12 of the starter via a series circuit comprising respectively an inductance 33, another inductanc 34 and a resistor 35. The negative output terminal of bridge 32 is connected directly to the other electrode of capacitor 11. The common point between inductances 33 and 34 is connected to the negative terminal of bridge 32 by a capacitor 36 connected in parallel across a series circuit comprising a resistor 37 and another capacitor 38. In parallel across capacitor 11 is connected a series circuit comprising an inductance 39 and a diode 40 whose cathode is connected to inductance 35. In the above described power supply 30, resistor 35 has a low value, much lower than that of resistor 39. Thus, the time constant of the charging circuit of capacitor 11 is much lower than for power supply 24, which allows an intensive use of the power supply (frequent start ups, for example in a pulsed operating mode), but on the other hand, the energy consumption is higher than with power supply 24.

Power supply 41 shown in FIG. 4 shows a particular case of the power supply 30 of FIG. 3, namely with non isolation of the starting circuit with respect to the main circuit. In this FIG. 4, the controlled rectifier bridge 4 has been shown connected by coil 10 to switch 5, the load 2, with its parallel capacitor 3, being connected as before to the output of switch 5.

To the phase conductors A, B, C of the mains power supply is connected a single phase rectifier 42, comprising three semi conductors, preferably thyristors controlled (via an interface circuit similar to circuit 17 of FIG. 1) by the central processor 15, similarly to the way in which the thyristors of bridge 4 are controlled. The output of rectifier 32 is connected to the terminals of the capacitor 11 by a circuit identical to that connecting the output of bridge 32 to capacitor 11 in the power supply 30, and comprising elements 33' to 40' respectively identical to elements 33 to 40. Of course, the central processor controls the thyristors of switch 5 so that the parallel thyristor across which the starting circuit is connected does not short circuit it on start up.

The detector circuit 8 has been shown in detail in FIG. 9. Circuit 8 comprises essentially a rectifier 43 followed by a pulse transformer 44. Rectifier 43, preferably a very fast diode, is disposed in series with the primary winding of transformer 44 and a protection and matching resistor 45 between the positive and negative input terminals 46, 47 respectively of circuit 8, the cathode of diode 43 being on the positive terminal side. In parallel across the primary winding of transformer 44 is connected a diode 48 in series with a resistor 49, a protective capacitor 50 being in parallel across diode 48, whose cathode is on the negative terminal 47 side. Elements 48, 49 provide demagnetization of the transformer 44 after the passage of each pulse.

The secondary of transformer 44 is connected, via a diode 51 connected for passing the negative pulses; to the input of an operational amplifier 52, the capacitor 53 and a resistor 54 being in parallel across this input. Diode 51 imposes the demagnetization of transformer 44 through its primary. Thus, at the output of amplifier 52 pulses are connected corresponding to the negative parts of the pulses arriving at the input of the detector circuit 8, the duration of this negative part being the reverse bias time tpi of the thyristors of switch 5.

In FIG. 10 the block diagram of the processing circuit 19 has been shown which receives information from the measuring transformers TM3 and TM4 as well as from probe S and the detector circuit 8.

The output of transformer TM3 is connected to a peak value detector 55, to a rectifier and zero cross over detector circuit 56 and to a first input of a multiplier 57 whose second input is connected to the output of transformer TM4.

The output of detector 55 is connected by a low pass filter 58, which has advantageously a turn off frequency of about 200 Hz, to an output terminal 60. The output of detector 56 is connected to an output terminal 61. The output of multiplier 57 is connected through a filtering device comprising, in the case where digital filters such as switched capacity filters are used, two cascade connected low pass filters 62, 63, to an output terminal 64. The turn off frequency of the first filter is greater than that of the second, these frequencies being advantageously about 1200 Hz, which eliminates the harmonics of the output signal of multiplier 57, without for all that practically eliminating the negative parts of the signal (whose duration may be small with respect ot the period of this signal, but whose amplitude may influence the mean value of this signal). If analog filters were used, a single one would be sufficient with turn off frequency of about 200 Hz.

The output of sensor S is connected via a low pass filter 65, having a turn off frequency of about 200 Hz, to a squaring device 66, which may be formed either by means of a multiplier (the two inputs of which are joined together), or by means of an ROM. The output of circuit 66 is connected to the divider input of a division circuit 67, whose dividend input is connected to the output of circuit 63, and whose output is connected to an output terminal 68. The output of filter 65 is also connected to an output terminal 69. It will be noted that sensor TM4 might be sufficient, but should switch 5 fail, there would then be no indication of the output current of rectifier 4, and the central processor cannot reacto appropriately.

The output of circuit 8 is connected to the input of pulse shaping and counting circuit 70. This circuit 70 converts the output pulses of circuit 8 into rectangular pulses and it outputs a signal representing the width of these pulses (i.e. the duration of time tpi) in a conventional way, for example by counting. The output of circuit 70 is connected to an input of a comparator circuit 71 whose other input is connected to a bus 72 of the central processor 15. The central processor sends over this bus the minimum value of tpi which is compared with the measured value from circuit 70. The output of comparator 71 is connected to a terminal 73.

The output terminals 60, 61, 64, 68, 69 and 73 of circuit 19 are connected, in a way not shown, to the central processor. The level of the signals appearing at these outputs is of course compatible with the values acceptable by the central processor.

The signal appearing at output 60 is the filtered envelope of the rectified peak output signal of the converter. Filter 58 eliminates the undesirable harmonics, in particular the harmonic at six times the frequency of the frequency of the three phase network 9 (because of the rectification by the three phase bridge 4). This signal at output 60 is compared by the central processor 15 with a reference value fixed or varying depending on an external phenomenon or on a control coming for example from terminal 22.

The pulses appearing at output 61 allow the frequency of the output voltage of the converter to be measured in a conventional way by means of a counter. The value of this frequency allows the corresponding optimum value of tpi to be determined, by simply reading from a correspondance table established beforehand by experimentation. The curve giving the tpi value as a function of the frequency has a substantially hyperbolic trend, as shown in FIG. 23. This correspondance table may be stored in the central processor 15 which controls, as a function of the tpi value thus determined, the firing of the thyristors of switch 5, as will be seen below with reference to FIGS. 6 and 7 in particular.

The value of the mean output power available at terminal 64 serves for regulating the power supplied by the converter to load 2. This output power value is compared by the central processor 15 with a fixed or variable reference value, as in the case of the output voltage regulation.

Probe S supplies a value equal, within a factor of proportionality, to the current Id flowing through the filtering inductance 10. At the output of filter 65 the mean sliding value of this current, available at terminal 69, is obtained for display and, if need be, for regulating the currents supplied by the converter in the same way as for regulating the output voltage, as described above.

By dividing the value of the output power by the square of the current Id, there is obtained, except for the value of the losses of the switch, the value of the equivalent DC resistance of the load circuit of the converter. If this equivalent resistance goes below a minimum value (determined experimentally) stored in the central processor 15, the output voltage of the converter is no longer sufficient for turning off the thyristors of switch 5 (with the output current being assumed unchanged, the reduction of the equivalent resistance signifies the reduction of the output voltage). The central processor chooses a longer tpi time than that given by said conversion table, which causes an increase of the output voltage so a degraded operating mode of the converter (reduced efficency), but guarantees the turn off of the thyristors of one diagonal of the switch before firing of the thyristors of the other diagonal. Such operation is then signalled on the display means 23 and may, if required, trigger off an alarm and/or modify the value of the capacity of the capacitor 3 connected in parallel across load 2. Of course, if the value of the equivalent resistance drops below a minimum value, the central processor may also cause trip-out of the converter. This equivalent resistance value reflects the quality of the power matching of the load to the converter, and may be permanently displayed on the display means 23 either in digital form, or in an appropriate graphic form. In addition, knowledge of this value allows the power and/or voltage regulation to be optimized.

When the value of the tpi of the thyristors of switch 5 drops below a minimum permitted value for the operating case in progress (this minimum value may evolve as a function of the frequency of the oscillating circuit 2, 3 which may very during operation), comparator 71 sends a corresponding signal to the central processor 15 which orders trip-out of the converter. In a variant, the central processor 15 may itself assume the function of comparator 71 which is then omitted. Knowledge of the instantaneous value of tpi is important because when it tends to be lower than the turn off of the thyristors, these latter may not be disabled and switch 5 is then short circuited. Such a fault may also occur if the voltage of the terminals of the switches is too low for turning off the output current.

Of course, if the circuits forming part of the processing circuit 19 shown in FIG. 10 are of the analog type, the signals present at all the output terminals of circuit 19 must digitized for feeding to the central processor 15. In the opposite case, the signals from TM3, TM4, S and 8 digitized before being fed to circuit 19.

The interface 17 shown in FIG. 11 comprises essentially a memory 74, a register 75, a counter 76 operating as a down-counter, an assembly 77 of six identical thyristor control amplifiers, and an assembly 78 of six pulse transformers connected in a conventional way, on the one hand, to the outputs of amplifiers 77 and, on the other, to the gates of thyristors TE1 to TE6 of rectifier 4.

The central processor 55 is connected by an address bus 79 to a part of the address inputs of memory 74. Each of the wires of the six wire output bus 80 of memory 74 is connected to a control input of a corresponding amplifier group 77. Bus 80 is also connected, via register 75, to another part of the address inputs of the memory 74.

Processor 15 is connected by a bus 81 to the positioning inputs of counter 76 whose counting status outputs are connected to a zero state decoder 82. The output of decoder 82 is connected to the clock input of a register 83 inserted in the bus 80 just before the input of group 77. The output of decoder 82 is also connected, via a delay circuit 84, to the clock signal input of register 75. Processor 15 is also connected to an inhibition input of counter 76, and a clock signal output of the processor is connected to the clock input of counter 76.

On start up of the converter, if need be after measurement of the natural frequency of circuit 2, 3, in the way indicated above, processor 15 determines, as a function of the instantaneous phase of the power supply network 19, which pair of thyristors it will fire at the next zero cross over of the voltage of the network and simultaneously it sends over bus 81 a word which is a function of the power which the converter is to supply. This power is determined by the striking angle of the thyristors of the rectifier 4. The value of the initial power may for example be introduced by the operator through the terminal 22. Said word sent over bus 81 positions the down counter 76 which down counts at the timing of the clock signals which it receives, and as soon as its reaches the zero state, decoded by decoder 82, the output signal of memory 74 (firing command of two of the thyristors of rectifier 4) reaches the control inputs of the corresponding amplifiers of group 77 which apply, through the two corresponding transformers of group 78, firing voltages to the two thyristors to be fired.

In FIG. 12 there is shown an example of the word which the processor 15 may send over bus 79, which comprises four wires in the present case. One of the wires is referenced M and controls the normal mode or the free wheel mode. In the normal mode, this wire is for example at the zero level. The other three wires, referenced C0, C1, C2 indicate which pair of thyristors must be fired at start up, after the next zero cross over of the voltage of the power supply means with a striking angle determined by processor 15. In Figure 12 one of the numerous examples of coding the three different thyristor pairs of rectifier 4 has been shown. The code "000" means for example that no thyristor pair is forced to fire by the processor 15, which occurs either when rectifier 4 is not yet operating, or after startup when the processor "hands over" to the sequencing circuit formed more especially by memory 74 and register 75.

This sequencing circuit, known for example from the articles on pages 154 to 157 of the review Computer Design of April 1978, operates in the following way: on start-up, the processor has determined that after the next zero cross over of the voltage of the power supply mains the thyristor pair (TE1, TE2) (abbreviated as "pair 1.2" in FIG. 12) should be fired, and it sends simultaneously to counter 76 a word corresponding to the firing angle. On such zero cross over, processor 15 activates counter 76 which begins to count down. Simultaneously, the output signal of memory 74, which indicates that thyristors TE1 and TE2 should be fired, is present at the input of register 83 and at the input of register 75. As soon as counter 76 reaches zero, decoder 82 sends a clock signal to register 83 which thus activates the amplifiers of 77 corresponding to the thyristors TE1 and tE2 which are then fired. After a brief delay time due to 84 (sufficient for the output signal of memory 74 to be taken into account by register 83), register 75 takes into account the output signal of memory 74 (which corresponds for the moment to firing of TE1-TE2).

Memory 74 is programmed so that when it receives at its address input connected to register 74 an address word corresponding to firing of a thyristor pair, it outputs a word corresponding to the firing of the next thyristor pair, in the firing order. This order is conventionally the following (the pairs being simply represented by the index numbers of the thyristors, namely 1, 2 for the pair TE1-TE2, etc): (1,2), (2,3), (3,4), (4,5), (5,6), (6,1), (1,2), etc . . .

As soon as the output word of memory 74 has been taken into account for the first time by register 83, the signal sent by the central processor over bus 79 passes to "0000", indicating that the normal mode continues to be in force and that sequences 74–75 may alone continue the procedure for firing the rectifier 4, which frees the processor 15 from the task of indicating the firing order of the thyristors of the rectifier.

As soon as counter 76 reaches zero, it stops, either through inhibitaion by processor 15, or by stopping the sending of clock signals.

On the next zero cross over of the voltage of the power supply mains, counter 76 is enabled and memory 74 indicates that the thyristor pair TE2, TE3 should then be fired, and the firing cycle of the thyristors of rectifier 4 will continue in the above mentioned firing order.

During normal operation of rectifier 4, the processor may intervene for modifying the word sent to counter 76, i.e. for regulating the output power or voltage.

When a free wheel request occurs, for example following a mains overvoltage defect during energy recovery the processor sends a "1" over the wire "M" of bus 79. Memory 74 is programmed so that, on the appearance of a "1" on wire "M", its output word is the same and so that in addition there is a change of another binary element corresponding to the firing of another thyristor of one of the legs of the bridge comprising a thyristor already fired. In FIG. 13 has been shown what occurs in this case at the level of the thyristors of rectifier 4, the thyristors which are fired being shown black. In the example of FIG. 13, it has been assumed that the free wheel order arrives just after the firing of thyristors TE1 and TE2. The output word of memory 74, on the appearance of a "1" on said wire "M", does not change in so far as the control of thyristors TE1 and TE2 is concerned but, in addition, the control of thyristor TE5 (which is in the same leg as TE2) is activated. Of course, TE4 (which is in the same leg as TE1) could be activated instead of TE5. As soon as counter 76 reaches the zero state, the output word of memory 74 is taken into account by register 83 and thyristor TE5 is activated, the counter 76 being then inhibited.

At the end of the phenomenon causing the free wheel mode, the processor 15 determines which pair of thyristors of rectifier 4 should be fired after the next zero cross over of the power supply voltage, and sends over the wires C0 to C2 of bus 79 a corresponding word, the wire "M" then receiving a "O". The same procedure as at start-up then takes place, in the way explained above.

Programming a memory 74 for obtaining the above described procedures is obvious for a man skilled in the art on reading the description which has just been given and so will not be described in greater detail.

The interface 17 such as described above by way of example may be formed differently, some of its elements being possibly replaced by other elements providing the same functions, or being possibly integrated in the central processor 15, particularly the elements 76, 82, 84 and even memory 74. In the case where rectifier 4 comprises a different number of thyristors, for example 12 or 24, the circuits 74, 77 and 78 are modified accordingly, in a way which is obvious for a man skilled in the art on reading the present description.

In the simplified block diagram of FIG. 14 has been shown the interface 18 for controlling the thyristors TS1 to TS4 of switch 5, controlled by the central processor 15. Interface 18 comprises a control circuit 85, shown in greater detail in FIG. 15, a group 86 of five identical amplifiers and an assembly 87 of five pulse transformers connected on the one hand to the outputs of amplifiers 86 and, on the other to the gates of thyristors TS1 to TS4 and thyristor 12. Circuit 85 comprises, at the input, an address decoding circuit 88 comprising essentially a circuit of type LS139 connected to bus 89 coming from the central processor 15. Over this bus 89 arrive in particular information comprising: the tpi value, the operating mode of the switch 5 (normal or short circuit), the start up mode (described below with reference to FIG. 19), the numbers of the thyristors to be fired and the clock frequency.

The output of decoder 88 is connected by a part of a bus 90 to the input of a register 91, which is connected on the other hand by the other part of bus 90, to the output of a frequency meter 92. The frequency meter 92 receives at its counting input the pulses corresponding to the zero cross overs ofthe output voltage of the converter and it further receives the clock signal from the central processor 15, which allows it to supply over bus 90 the value of the frequency of the output voltage of the converter. The output information of the frequency meter is also fed to a comparator 93 which compares it with a minimum value and with a maximum value, either stored in the comparator, or transmitted by the central processor. If the frequency measured is outside the permitted limits, comparator 93 signals this fact to the central processor which may stop the converter.

Register 91 sends over its output bus 94 to a counter 95 the tpi value determined by the central processor 15. Counter 95, operating as a down counter, determines, like the counter 76 of interface 17, the striking time of the thyristors of switch 5 from the zero cross overs of the output voltage of the converter, in the way explained below with reference to FIGS. 6 and 7, and this counter also receives clock pulses from the clock generator of the central processor.

When counter 95 reaches zero, it sends an order to a pulse generator 96 which sends the appropriate striking pulses to the thyristors of the switch and to thyristor 12 through a routing circuit 97 controlled by the central processor 15 through circuits 88 and 91. This routing circuit is of conventional type, comprising electronic switches controlled selectively by the orders received from the central processor, and possibly decoded. The central processor controls, through the circuit 88, over a line 98, the writing the value of the tpi into the counter 95 and generator 96.

In the embodiment shown in FIG. 15, interface 85 controls, besides the thyristors TS1 to TS4 of switch 5, the thyristor 12 of the starting circuit. In a variant, shown in FIG. 1, the control circuit of thyristor 12 may be separate from interface 18 and we then have an interface specific to the starting circuit, referenced 20, which comprises essentially a pulse generator controlled by the central processor and an amplifier with its pulse transformer.

An example of the output word of the frequency meter 92 has been shown in FIG. 16. The informationn supplied by the frequency meter 92, is for this example, the value of the half period T of the output voltage of the converter, i.e. practically the time lapse separating two consecutive zero cross overs of this output voltage. Since the resolution of this information is 0.5 microsecond and since the frequency of the oscillating circuit (2,3) may drop to about 300 Hz, 12 binary elements are sufficient for defining this word. Since the output signal of the frequency meter used is defined over eight binary elements, the period information T is split in two. The frequency meter feeds first of all to the cells D0 to D7 (in the order of increasing weight of the binary elements) of the register R1 of circuit 88, the low weight elements F0 to F7 of the information, then the high weight elements F8 to F11, as well as four other binary elements of any value, marked "X", which are not taken into account.

Circuit 88 comprises another register 42 with eight cells (FIG. 17) charged with receiving from the central processor 50 a "frequency meter only" mode order and a first starting phase order, and possibly a second starting phase order (see below explanations in connection with FIG. 19). These orders may be coded numerous different ways, "X"s have been simply placed in the cells D0 to D7 of this register.

The indication of the tpi value (or T-tpi, as explained below with reference to FIG. 6 and 7), requires, as for that of the value of T, 12 binary elements for the above described embodiment. This tpi (or T-tpi) value transits through a register R3 of circuit 88 of which the successive contents of cells D0 to D7 have been shown in FIG. 18. In a first stage, the binary elements T0 to T7 of this value are stored in cells D0 to D7, then in a second stage the four heavy weight elements T8 to T11. During this second stage, information TS concerning the choice of the thyristors to be controleld (either thyristor 12, or two of the four thyristors TS1 to TS4) and information ALL concerning the firing mode (normal or short circuit, i.e. simultaneous firing of the thyristors TS to TS4) are also sent to this register R3. The last two pieces of information are stored in cells D4 and D5 of R3, cells D6 and D7 not receiving any information.

In the timing diagram of FIG. 19, there are shown from top to bottom the signal applied to the gate of thyristor 12, the signal applied to the gates of thyristors TS1 to TS4 (the thyristor pairs fired simultaneously are indicated "1.2" or "3.4"), the output voltage US of the converter for the first phase only and the signal at the output 61 (zero cross overs of US) during the first phase only.

During the first phase, between times t0 to t1, which is a frequency measurement phase only (the thyristors of the switch are not fired), there is measured at least once, and preferably three times, the half period T of the oscillations of the output voltage US, produced by sending a firing pulse to the gate of thyristor 12 at time t0. In the present example, the width of this pulse is about 12 microseconds. Firing of thyristor 12 short circuits it, which allows the capacitor 11 (charged by the auxiliary power supply 14 to a relatively high voltage, for example about 500 volts) to discharge through the inductance 13 in the load circuit (2,3) which is a parallel oscillating circuit, the capacitor 11 forming with inductance 13 a series oscillating circuit. The resonance frequency of this series oscillating circuit is preferably chosen higher than that of said parallel oscillating circuit, advantageously 1.25 times higher than the maximum resonance frequency of the parallel circuit. In one embodiment, the resonance frequency of the parallel circuit may vary between about 300 Hz and 3 KHz, and the frequency of the series circuit is chosen at about 4 KHz. It can be seen that the frequency of the oscillations of the output voltage corresponds practically to the resonance frequency of the parallel oscillating circuit (2,3). To obtain greater precision, several successive measurements, for example three, may be made and the average thereof calculated. Thus, without injecting power into the load, the resonance frequency of the circuit which it forms with its parallel capacitor may be finally known, which is particularly advantageous during tuning of this load.

If it is desired to start up the converter after this first phase, a time t1 a pulse is sent to the gate of thyristor 12 and simultaneously at least one pulse and preferably 3 to 5 pulses are sent to the gate of thyristors TS1 and TS2, all these pulses having the same length, 12 microseconds for the example quoted. If a succession of several pulses are sent to thyristors TS1 and TS2, these pulses are separated by intervals equal to their width. The time interval between t0 and t1 must sufficiently large to allow acquisition of the value of the frequency thus measured, but may be as long as desired. Of course, at time t1 the rectifier 4 must already be operating.

Firing of thyristors TS1 and TS2 tends to cause a current to flow in the load having the same direction as the initial current produced at the time of firing of thyristor 12. Since inductance 10 has generally a high value, the output current of rectifier 4 only increases very slowly (see FIGS. 6 and 7).

At the end of a period T after time t1, namely at time t2, a firing pulse is sent to thyristors TS3 and TS4, which reverses the direction of the output current IS of switch 5, the absolute value of this current continuinng to increase in accorance with the same law of variation as between times t1 and t2, i.e. a substantially exponential law. In some cases a series of several firing pulses may be sent to thyristors TS3 and TS4, in addition to or in place of the series sent after t1 to thyristors TS1 and TS2.

After a lapse of time substantially equal to the half period of the output voltage US (measured by the frequency meter 92), at time T3, a firing pulse is sent to thyristors TS1 and TS2, which reverses the direction of the output current of switch 5. This procedure then continues with the same alternation of firing of the thyristors of the switch, with a period substantially equal to the half period T of the output voltage US, the value of T being regularly monitored by the central processor (signal at terminal 61).

The value of the time lapse t, between times t1 and t2, is determined experimentally so as to ensure a good start up of the converter and it has been discovered that it varies with the frequency f of the parallel oscillating circuit, according to a law of variation of the form indicated in FIG. 23, which may be expressed by:

$$t = K1 + K2/f$$

(K1, K2 being experimentally determined constants).

In practice, the firing times of thyristors TS1 to TS4, from time t3 are determined as a function of the zero cross overs of the output voltage US. In fact, during each reversal of the output current, the thyristors which were previously turned on can only be turned off with certainty if they are negatively biased for a given time, which is said tpi. Conseqently, reversal of the output current must precede by a time tpi the reversal of the output voltage (zero cross over) which serves as a refereance). In practice, it may be simpler to refer to the zero cross over preceding the reversal, i.e. the reversal of the output current is ordered a time (T-tpi) after a zero cross over of the output voltage (see FIGS. 6 and 7), T being the half period of this output voltage (which will be assumed practically unvaried with respect to the value which it had just before this zero cross over, if not the central processor which permanently controls its value readjusts the time (T-tpi) for the subsequent reversals of the output voltage).

The timing diagram of FIG. 5 refers to the first phase (beginning at t0 in FIG. 19) alone. In this timing diagram, the variation trends of the output voltage of the converter US of the voltage U12 at the terminals of the thyristor 12, of the voltage U11 at the terminals of capacitor 11 and of the current I13 in inductance 13 have been shown. Just before time t0, capacitor 11 is charged by the power supply 14 to a high voltage (for example 500 V). At t0, the thyristor 12 is fired and becomes almost a short circuit. The current in inductance 13 begins to increase, as well as the output voltage US, whereas the voltage at the terminals of capacitor 11 decreases. At the end of the firing pulse of thyristor 12, since the voltage of the terminals of the load have a high value and since that at the terminals of capacitor 11 has greatly decreased, the thyristor is heavily reverse biased and is immediately disabled. The voltage at the terminals of thyristor 12 then becomes suddenly negative, the voltage of the terminals of capacitor 11, which had just become negative (because the voltage of the terminals of the load had increased), is stabilized at a negative value, whereas the voltage at the terminals of the load begins to oscillate about a mean zero value, with a decrease of exponential form, and the voltage at the terminals of thyristor 12 also begins to oscillate, about a mean value equal to the stabilized negative voltage at the terminals of the capacitor 11, with a decrease which is also exponential. Then, the voltage U11 rises again to its initial value with a very slight slope.

The timing diagram of FIG. 6, refers to the real start up phase (from time t1 in FIG. 19). At this time t1, for simplifying the drawings, it is assumed that only one firing pulse is sent to thyristors TS1 and TS2, rectifier 4 being already in operation. This timing diagram refers to the case where the natural frequency of the load circuit is at a relatively high value (3000 Hz for example), the natural frequency of the starting circuit being slightly greater (4000 Hz for example).

At time t2, with thyristor 12 fired, the current in inductance 13 increases up to a maximum value, then decreases with a substantialy semisinusoidal trend. Since thyristor 12 only receives a single firing pulse, the current I13 drops back to a zero value and is held there.

During this time, the energy supplied by capacitor 11 is transmitted to the load (2.3) which starts an oscillating procedure. The first half period of voltage US at the terminals of the load having a duration slightly greater than the duration of the current half wave I13.

At the end of a period t (about 85 microseconds for the example quoted), processor 15 sends a firing pulse to thyristors TS3 and TS4 (time T2), which reverses the direction of the current IS supplied by the switch to the load. This time T2 is of course prior to the first zero cross over of the voltage US, which negatively biases the thyristors TS1 and TS2 which are thus turned off. Current IS continues to increase, in absolute value, in accordance with the same law as before.

At a time t3, occuring a time tpi (about 35 microseconds for the example quoted) before the next zero cross over of the voltage US, the processor sends a firing pulse to the thyristors TS1 and TS2, which again reverses the direction of current IS. As stated above, time t3 may be determined in two ways: either, if it is known at what time the next zero cross over of US will take place, the time t3 will be situated at time tpi before this next cross over, or, by taking the last zero cross over of US as starting point, the sending of a firing pulse is delayed by a time (T-tpi).

Continuing this procedure of alternate firing of (TS1, TS2) and (TS3, TS4), it can be seen that the current IS increases, in absolute value, up to a value at which it is stabilized and the voltage US decreases to a stable value, assuming that the parameters of the load do not vary. Such stable operating conditions may be obtained, for the frequency values taken as examples, in a few milliseconds. The timing diagram of FIG. 7, similar to that of FIG. 6, relates to the case where the natural frequency of the load circuit has a relatively low value (about 300 Hz), whereas the natural frequency of the series starting circuit has the same relatively high value (about 4000 Hz). The starting procedure is identical to that of the case illustrated in FIG. 6, but the values of T and tpi are very different: for the example quoted, the time t passes to about 380 microseconds and tpi to about 350 microseconds. Since the natural frequency of the series circuit is appreciably higher than that of the parallel circuit, the duration of appearance of current I13 is appreciably less than the half period of the voltage US. The retrogression point C which can be seen in the curve of the current IS is the reflection of a retrogression point of the current flowing through the inductance 10 (this current comprises undulations having the form of a succession of half waves of the same direction, whose junction points are retrogression points). If the natural frequency of the load circuit varied between about 1 and 10 KHz, that of the starting circuit would be about 12 to 14 KHz.

The timing diagram of FIG. 8 relates to a case similar to that of FIG. 6, with expansion of the time scale so as to be able to represent the voltage U12 at the terminals of thyristor 12 during disablement thereof.

At time t2, with the current IS reversed, the volages U12, which was substantially zero up to then, becomes slightly negative (difference between the voltages US and U11), then passes to zero after a time tpi, increasing and decreasing at the timing of the oscillations of the voltage US. The time tpi is the reverse bias time of thyristor 12 and, because it is relatively short (40 microseconds or so for the example illustrated in the drawings), the thyristor 12 must be chosen very fast so as to be disabled before the end of tpi'.

The diagrams of FIGS. 20 and 21 relate to use of the thyristors of switch 5 in the short circuit mode. Such a mode may for example be caused at the time of an output over-voltage of the switch. FIG. 20 shows the most frequency firing case in which the four thyristors TS1 to TS4 are fired well after normal firing of the pair (1.2). The short circuit request is the signal referenced "ALL" in FIG. 18. The "gate control" line is the signal sent to the gates of the thyristors concerned of switch 5. FIG. 21 shows short circuiting while the transformers for switching on TS1 to TS2 are being demagnetized. The four thyristors of the switch are fired simultaneously imemdiately after the lapse of time allowed to said transformers for being demagnetized (12 microseconds for a firing pulse of 12 microseconds).

Finally, in FIG. 22, the operation of counter 95 used as a downcounter is shown. In the first line, the contents V have been shown of the register receiving the value of tpi determined by the central processor 15. If these contents change and become V', following detection by the processor of a variation in the natural frequency of the load, this change is taken into account at the next zero cross over of counter 95 and the frequency at which the control pulses are sent to the thyristor gates (TS1, TS2) and TS3, TS4) is accordingly modified following such taking into account.

The converter of the invention is not necessarily used with a load formed by a resonating circuit. It may for example use, in the place of this load circuit, a rectifier circuit supplying any load with DC. current; in this case, the frequency of the output current of the switch is advantageously appreciably greater (several orders of size) than that of the power supply network, which appreciably improves the wave form of the current taken from the network with a low cost price filtering circuit.

I claim:
1. A static power frequency converter, comprising
   a rectifier (4) having an input and an output and including controlled semiconductors (TE1-TE6) with control electrodes;
   a switch (5) having an input and an output and including controlled semiconductors (TS1-TS4) with control electrodes;
   and inductor (10) connecting the output of the rectifier to the input of the switch;
   means for measuring (TM3, TM4, S, 8) a voltage output and a current output of the switch (5), and a current supplied by the rectifier (4) to the switch (5), and a reverse bias time of the controlled semiconductors of the switch (5);
   means for detecting (TM1, TM2) a zero crossover of a voltage supplied to the input of the rectifier;
   a processing circuit (19) connected to an output from the measuring means and from the detecting means;
   a digital computer central processor (15) connected to an output of said processing circuit, and having at least two outputs; and
   at least two interface circuits (17, 18) connecting one of said computer outputs to the control electrodes of the controlled semiconductors of said rectifier, and another of said computer outputs to the controlled electrodes of the controlled semiconductors of said switch (5).

2. The frequency converter according to claim 1, wherein the processing circuit (19, FIG. 10) comprises a peak value detector (55) having an input connected to an output of the means for measuring the output voltage (TM3) and an output connected via a first low pass filter (58) to a first output (60) of the processing circuit; a zero cross over detector (56) having an input connected to the output of said output voltage measuring means (TM3) and having an output (61) forming a second output (61) of the processing circuit; a multiplying circuit (57) having a first input connected to the output of said output voltage measuring means (TM3), a second input connected to an output of the output current measruing means (TM4); and an output connected via a second low pass filter (62, 63) to a third output (64) of the processing circuit; a divider (67) having two inputs one of which is connected to the output of said second low pass filter (62, 63) and an output connected to a fourth output (68) of the processing circuit; and output of the means (S) for measuring the current supplied by the rectifier to the switch (5) being connected by a third low pass filter (65) to both an input of a squaring device (66) and also to a fifth output (69) of the processing circuit; said squaring device (66) having an output connected to another of said two inputs of said divider (67); said outputs of the processing circuit being connected to the central processor.

3. Frequency converter according to claim 2 characterized by the fact that when the value of the equivalent resistance of a load circuit, available at said fourth output (68) of the processing circuit, drops below a limit value, the central processor chooses a value of tpi greater than that which would have been normally used.

4. Frequency converter according to claim 2, characterized by the fact that the filtering device (62,63) disposed at the output of the multiplying circuit comprises two cascade connected filters, the turn off frequency of the first one being greater than that of the second.

5. Frequency converter according to claim 4, connected to a three phase 50 or 60 Hz power supply network and whose rectifier is a three phase bridge, characterized by the fact that the turn off frequency of the first filter is about 1000 Hz and that of the second about 200 Hz, these filters being of the switched capacity type.

6. Frequency converter according to claim 1 wherein the means (8) for measuring the reverse bias time of the controlled semiconductors of the switch (5) comprises a high speed rectifier (43) in series with a primary winding of a pulse transformer (44) and a protective resistance (45) between output terminals (46, 47) of the rectifier (4), a secondary of the pulse transformer being connected via an operational amplifier and a shaping and counting circuit (70) to an input of a comparator (71) receiving at its other input the minimum value of the reverse bias time calculated by the central processor, the output of the comparator being connected to the central processor.

7. Frequency converter according to claim 6, characterized by the fact that in parallel across the primary winding of the pulse transformer (44) there is disposed a diode (48) connected in the passing direction in series with a resistor (49), the diode being in parallel across a protective capacitor (50), and that the secondary winding of this transformer is connected to the amplifier (52) by a diode (51) connected in the blocking direction, a parallel circuit comprising a capacitor (53) and a resistor (54) being connected to the input of the amplifier.

8. Frequency converter according to claim 1 characterized by the fact that a starting circuit (6) is connected to the switch (5) said starting circuit comprising a resonating circuit (11,13) disposed in series with a controlled rectifier (12) connected to and controlled by the central processor (19) the capacitor (11) of this resonating circuit being supplied by an auxiliary power supply circuit (14).

9. Frequency converter according to claim 8, supplying a load formed by a resonating circuit (2,3), characterized by the fact that the natural frequency of the resonating circuit of the starting circuit is equal to or greater than that of the load resonating circuit.

10. Frequency converter according to claim 9, characterized by the fact that, with the natural frequency of the load circuit variable between 300 Hz and 3 KHz. the natural frequency of the resonating circuit of the resonating circuit of the starting circuit is about 4 KHz.

11. Frequency converter according to claim 9, characterized by the fact that, with the natural frequency of the load circuit variable between 1 and 10 KHz, the natural frequency of the resonating circuit of the starting circuit is about 12 to 14 KHz.

12. Frequency converter according to one of claims 8 to 11, characterized by the fact that with one of the resonating circuits a parallel resonating circuit, the other is a series resonating circuit.

13. Frequency converter according to claim 8, characterized by the fact that, without setting its rectifier (4) in operation, the processor sends a firing pulse to the controlled rectifier (12) of the starting circuit, and that it measures the frequency of the half period (T) of the damped oscillations caused at the terminals of the load by discharge of the capacitor (11) of the oscillating cirucit of the starting circuit.

14. Frequency converter according to claim 8, characterized by the fact that at the time of start up of the converter (t1), with the rectifier in operation, the central processor (15) sends a firing pulse to the controlled rectifier of the starting circuit and at least one firing pulse to one of the thyristor pairs (TS1-TS2) of the switch, and that a time (t) after this starting time, the processor sends (t2) to the other thyristor pair (TS3-TS4) of the switch at least one firing pulse, the time (t) being determined by the processor from a conversion table established experimentally and which it has stored in memory, the subsequent alternate firing of the thyristors of the switch being controlled as a function of the zero cross overs of the voltage at the terminals of the load with each time an advance equal to said tpi determined by the central processor.

15. Frequency converter according to claim 8, characterized by the fact that the auxiliary power supply circuit (14) comprises a rectifier circuit (26,32) whose input is connected by an isolating transformer (25,31) to the power supply network of the converter, and whose output is connected to the capacitor (11) of the starting circuit by a smoothing circuit (27 to 29 or 33 to 40).

16. Frequency converter according to claim 8, characterized by the fact that the auxiliary power supply circuit comprises a rectifier circuit (42) whose input is directly connected to the power supply network of the converter, and whose output is connected by a smoothing circuit (33' to 40') to the capacitor of the starting circuit.

17. Frequency converter according to claim 1 wherein the controlled semiconductors are thyristors connected in pairs and that the central processor sends firing pulses to each thyristor pair of the switch a time tpi before a next zero crossover of the voltage of the terminals of a load connected to the switch output, or a time T - tpi after the last zero crossover of this voltage tpi being the reverse bias time imposed on the thyristors by the processor as a function of the frequency of the voltage at the terminals of the load this time being determined by the processor according to a conversion table established experimentally and which is stored in memory, and T being the half period of the voltage at the terminals of the load.

* * * * *